Figure 1:
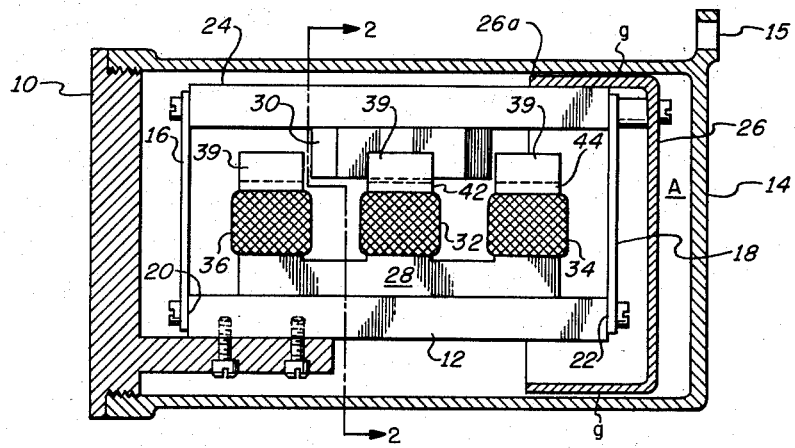

June 22, 1965  J. D. WEIR  3,190,128
ACCELEROMETER
Filed Feb. 26, 1962  2 Sheets-Sheet 1

INVENTOR.
JOHN D. WEIR
BY
ATTORNEY

June 22, 1965　　　　　J. D. WEIR　　　　　3,190,128
ACCELEROMETER
Filed Feb. 26, 1962　　　　　　　　　　　　　2 Sheets-Sheet 2

INVENTOR.
JOHN D. WEIR
BY
ATTORNEY

United States Patent Office 3,190,128
Patented June 22, 1965

3,190,128
ACCELEROMETER
John D. Weir, Huntington, N.Y., assignor to Sperry Rand Corporation, Great Neck, N.Y., a corporation of Delaware
Filed Feb. 26, 1962, Ser. No. 175,641
1 Claim. (Cl. 73—516)

This invention relates in general to accelerometers and in particular provides an instrument having an acceleration responsive movable mass, movement of which is damped by means of a gaseous medium.

As presently practiced, accelerometer damping is usually by means of viscous liquids such as oil. Since liquid viscosities decrease with increasing temperatures, the damping characteristics of present accelerometers are subject to change when environmental temperatures change. Contrarily, gas viscosities remain substantially constant over wide temperature ranges (increasing slightly with increasing temperatures) and are, therefore, employed to damp the accelerometer herein described.

The present accelerometer has a piston interconnected with its movable mass; the piston loosely fits within a closed cylinder. Movement of the mass (which is detected by an E pick-off transformer, the armature of which is secured to the mass) creates a differential gas pressure across the piston and causes gas to flow laminarly in the clearance between the piston and inner cylinder walls, thereby producing damping.

Because the invention employs a loosely fitting piston and cylinder, means is provided to assure that the damping and actual operation of the accelerometer are not affected by contact between the piston and cylinder walls. That is, the present accelerometer has its mass (and therefore its interconnected piston and pick-off armature) suspended by means of parallel flat springs such as are employed in the accelerometer of U.S. Patent No. 2,883,176, issued in the name of Alfred Bernstein and assigned to the assignee of this invention. As explained in that patent, parallel springs themselves, unless they are perfectly flat, introduce an undesirable side effect, namely a shift in the null position of the pick-off armature when the force thereon is changed by variations in the transformer excitation voltage, such force (hereinafter referred to as the solenoidal force) being caused by the field of the excitation winding. To overcome this undesirable side effect, the present invention provides an E transformer stator which is so modified that its field is redistributed to minimize the solenoidal force.

Since parallel flat springs allow only curvilinear movement of suspended armatures (resulting in non-linear output characteristics), the present invention also provides a modified pick-off armature which operates to cancel such adverse effect.

A principal object of the invention is to provide a gas damped accelerometer.

Another object of the invention is to provide an accelerometer utilizing parallel flat springs to suspend an acceleration responsive movable mass and an interconnected E pick-off transformer armature, the stator of the armature of the E transformer being shaped to minimize solenoidal forces on the armature.

Another object of the invention is to provide an accelerometer employing an E pick-off transformer for detecting movement of a mass movable in response to acceleration, such transformer having a curvilinearly moving armature shaped to assure linear accelerometer output characteristics.

Figure 2:
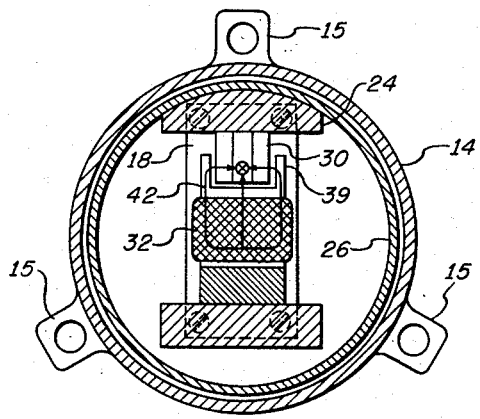
Figure 4:
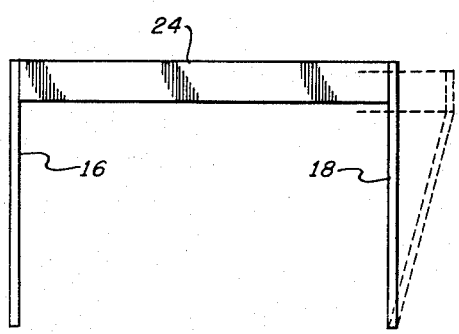
Figure 3:
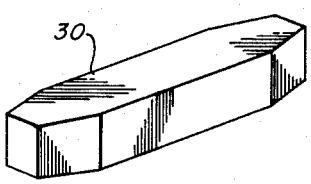
Figure 5A:
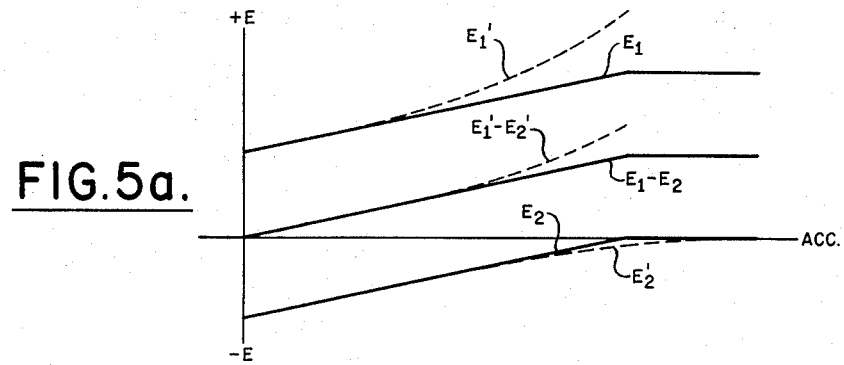
Figure 5B:
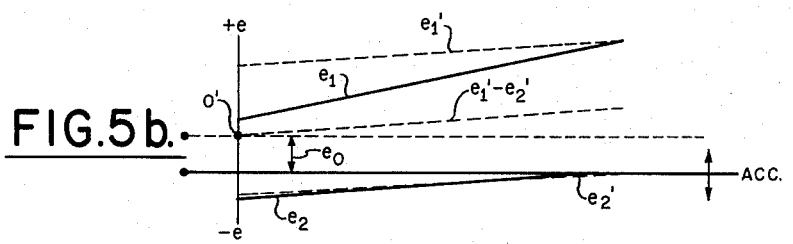
Figure 6:
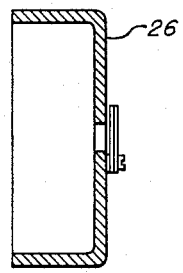
Figure 7:
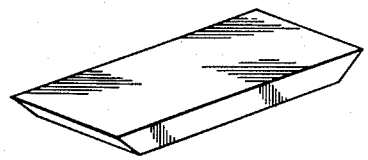
Figure 9:
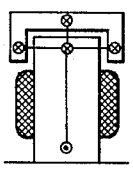
Figure 8:
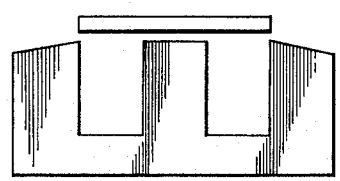

The invention will be described with reference to the figures wherein:

FIG. 1 is an elevational view, partly in section, of an accelerometer embodying the principles of the present invention, FIG. 2 is a view of the present accelerometer taken along the line 2—2 of FIG. 1, FIG. 3 shows the general configuration of an E pick-off armature using a principle of the invention, FIG. 4 is a diagram useful in describing the operation of the instant damping apparatus, FIGS. 5A and 5B are diagrams useful in describing the operation of an E pick-off transformer employing a principle of the present invention, FIG. 6 shows a piston usable with the present accelerometer, FIG. 7 shows an E transformer armature usable with the present accelerometer, FIG. 8 depicts an alternative E transformer configuration usable with the accelerometer of the present invention, and FIG. 9 depicts still another E transformer configuration usable with the present accelerometer.

Referring to FIGS. 1–3, the present accelerometer has a main support member 10 having a base 12 and cover 14. Parallel flat springs 16 and 18 are secured respectively to the base 12 at points 20 and 22 and suspend a massive member 24. The massive member 24 suitably supports a piston 26 (which is part of the mass system) having such dimensions that a loose fit is provided between the piston 26 and inner walls of the cover 14, such loose fit preventing gas from becoming sealed within the cover portion A and causing the piston to respond in a spring-like manner.

Movement, for example, of the whole accelerometer of FIG. 1 to the left causes relative movement of the suspended mass 24 and piston 26 to the right, i.e. the springs 16 and 18 bend to the right. This compresses air trapped at A and produces a differential pressure across the piston 26. This differential pressure acting on the piston face produces a damping force which causes gas to flow laminarly through the clearance between the piston 26 and inner walls of the cover 14, thereby viscously damping the movement of the mass 24.

The base 12 supports the stator 28 of an E pick-off transformer, the transformer armature 30 being supported by the acceleration responsive mass 24. The transformer primary winding is referenced by the numeral 32 and the secondary windings are referenced by the numerals 34 and 36. The transformer armature 30 has tapered ends as shown in FIG. 3. As stated earlier, any concavity of the springs 16 and 18 causes armature null position shift when the transformer primary winding 32 excitation voltage varies, i.e. when the solenoidal pull on the armature 30 varies. To minimize this adverse effect, the E pick-off transformer stator 28 is provided with permeable extensions 39 to its polar sections 40, 42 and 44, such extensions forming a shield which so distributes the magnetic flux linking the transformer primary winding 32 with its secondary windings 34 and 36 that only a minimal amount of flux solenoidally affects the armature 30. See FIG. 2.

Since the springs 16 and 18 are secured to the base 12 at points 20 and 22 respectively, the mass 24 and armature 30 are forced to move curvilinearly in the manner depicted in FIG. 4. Should the armature 30 be untapered and of conventional design, i.e. rectangular, the accelerometer will have output characteristics like those shown in FIG. 5a. FIG. 5a shows that the output differential voltage $E'_1-E'_2$ (i.e. the difference between the transformer secondary winding output voltages) of an E transformer employing a conventional armature nonlinearly increases with increasing acceleration, this condition being due to the fact that not only does the translational distances between the primary and secondary windings respectively increase and decrease but that the armature approaches a contiguous relationship with the primary and only one transformer secondary. The voltage curves $E_1$, $E_2$ and $E_1-E_2$ result under ideal condition, i.e. when a rectangular armature moves along a line that is in planes respectively perpendicular and parallel to the axes of all transformer windings.

Referring now to FIG. 5b, should a tapered armature (the degree of taper being dependent on the spacing between and the lengths of the springs 16 and 18) move along a line that is in planes respectively perpendicular and parallel to the axes of all transformer windings, one secondary winding will produce a voltage $e_1$ and the other secondary winding will produce a voltage $e_2$, the $e_1$ characteristic curve being steeper because it is the result of a decreasing flux path length combined with decreasing reluctance per unit path length whereas the $e_2$ characteristic curve is the result primarily of an increasing flux path length. Since, in actuality, the armature curvilinearly moves toward its respective stator, the tendency is for the $e_1$ curve to become less steep, i.e. assume the position of the $e'_1$ curve. The $e_2$ characteristic curve similarly becomes less steep (assuming the position of the $e'_2$ curve), however only slightly because of the very loose coupling between the secondary winding producing the voltage $e'_2$ and the primary winding. The differential voltage $e'_1-e'_2$ is now a straight line originating at $O'$. By providing means for mechanically shifting the null position of the armature or electrically subtracting a voltage $e_0$ from the differential voltage $e'_1-e'_2$, the accelerometer of FIG. 1 may be made to have a linear output characteristic and no output signal when its armature is at its null position.

Whereas the presently preferred form of the invention has been described, modifications may be made as follows: The piston 26 may include (see FIG. 6) a thermostatically controlled aperture to assure an absolutely constant damping characteristic. Also, the tapered ends of the transformer armature may be as shown in FIG. 7 or left untapered with tapered secondary polar members as shown in FIG. 8; these modifications indicate that linear output characteristics can be provided for an accelerometer having a relatively curvilinearly moving E transformer stator and armature so long as variations are made in the reluctance per unit path length between the primary winding of the transformer and the secondary winding producing the greater voltage, e.g. by decreasing and increasing such reluctance per path length when the armature curvilinearly moves respectively toward and away from the stator. The above-described spring concavity problem can be solved also by enveloping conventional polar members with a U-shaped armature (see FIG. 9), this solution indicating the requirement that flux produced by E transformer primaries be diverted from paths solely parallel to the axes of the transformer windings. In addition, the spring concavity problem can be minimized by increasing both the spring stiffness and the mass weight, thereby effectively keeping the accelerometer sensitivity constant while decreasing the solenoidal effect.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

An accelerometer comprising a base, a mass, a pair of flat cantilever springs, one end of each spring being rigidly secured to said end portions of said base and the other end of each spring being rigidly secured to end portions of said mass whereby said mass is capable of constrained longitudinal movement relative to said base under the influence of acceleration forces acting thereon, an E transformer mounted on the mid portion of said base and located between said springs, and said mass constituting, at least in part, a movable armature cooperable with said transformer, means for electrically energizing said transformer whereby upon movement of said armature an electrical signal will be produced in accordance with such movement, and a cylinder and cylindrical cup-shaped piston loosely fitting therein, said cylinder being the housing for the accelerometer and containing gas therein, and said piston being rigidly secured to said mass and adapted to contain at least part of said mass and base, being however disposed to have its inner wall in spaced apart relationship with said base, whereby said piston is moved by said mass when said mass moves, said piston being of such size that a clearance is provided between the piston outer wall and the inner cylinder walls sufficient to prevent gas from becoming sealed on one side of said piston.

References Cited by the Examiner

UNITED STATES PATENTS

| | | | |
|---|---|---|---|
| 2,387,223 | 10/45 | Carson | 73—71.2 |
| 2,419,979 | 5/47 | Wilson | 336—30 X |
| 2,552,722 | 5/51 | King | 73—516 |
| 2,774,057 | 12/56 | Jones | 336—30 X |
| 2,883,176 | 4/59 | Bernstein | 73—516 |
| 2,912,863 | 11/59 | Naybor | 336—30 X |
| 2,945,378 | 7/60 | Martin | 73—516 |
| 2,958,137 | 11/60 | Mueller | 73—516 X |
| 2,959,459 | 11/60 | Ryan | 73—516 X |
| 2,974,529 | 3/61 | Brueggeman | 73—503 |
| 2,978,631 | 4/61 | Wittke | 336—134 X |
| 3,104,552 | 9/63 | Bouchard | 73—497 |

FOREIGN PATENTS

| | | |
|---|---|---|
| 1,012,387 | 4/52 | France. |
| 764,388 | 12/56 | Great Britain. |

RICHARD C. QUEISSER, *Primary Examiner.*

SAMUEL LEVINE, JAMES J. GILL, *Examiners.*